US007085242B2

(12) United States Patent
Liu

(10) Patent No.: US 7,085,242 B2
(45) Date of Patent: Aug. 1, 2006

(54) VIRTUAL IP TOPOLOGY RECONFIGURATION MIGRATION

(75) Inventor: Kevin H. Liu, Ocean Township, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 1068 days.

(21) Appl. No.: 10/104,241

(22) Filed: Mar. 22, 2002

(65) Prior Publication Data

US 2003/0179716 A1 Sep. 25, 2003

(51) Int. Cl.
*H04J 14/02* (2006.01)
(52) U.S. Cl. .......................................... 370/254; 398/7
(58) Field of Classification Search ................ 370/254, 370/252, 352, 400, 409; 398/1, 7
See application file for complete search history.

(56) References Cited

U.S. PATENT DOCUMENTS

| 6,728,484 | B1 * | 4/2004 | Ghani ......................... 398/42 |
| 7,031,299 | B1 * | 4/2006 | Chaudhuri et al. ......... 370/352 |
| 2001/0033550 | A1 * | 10/2001 | Banwell et al. ............. 370/254 |
| 2002/0145779 | A1 * | 10/2002 | Strasser et al. ............. 359/124 |

OTHER PUBLICATIONS

Bala Rajagopalan, et al., "IP Over Optical Networks: A Framework," IETF-IPO Framework-01.txt, Internet Draft, Work in Progress.

* cited by examiner

*Primary Examiner*—Min Jung
(74) *Attorney, Agent, or Firm*—William A. Schoneman; Joseph Giordano

(57) ABSTRACT

A virtual IP topology in an IRW network is dynamically migrated from a current topology to a new topology while minimizing end user impact by maximizing network connectivity and by minimizing impact on heavier traffic communications. The virtual IP connections that must be added and removed to migrate from the old to the new topology are first determined. Next, two connections are selected and removed from the network with the objective of maintaining network connectivity and minimizing impact on heavier traffic communications. All virtual connections that satisfy resource constraints are then selected and added to the network. Next, at most one virtual connection is selected and removed from the network, the selected connection being the least loaded connection that leaves the network in a connected state. Finally, virtual connections are continuously added and removed until the network is completely migrated to the new topology. In a second embodiment, butterfly switching is initially performed.

23 Claims, 6 Drawing Sheets

VIRTUAL IP TOPOLOGY RECONFIGURATION MIGRATION

GOVERNMENT LICENSE RIGHTS

This invention was made with Government support under Contract F30602-98-C-0202 awarded by the Air Force. The Government has certain rights to this invention.

BACKGROUND OF MY INVENTION

1. Field of the Invention

My invention relates generally to traffic management of communications networks, and more specifically, Internet Protocol (IP) over reconfigurable WDM (Wavelength Division Multiplexing) optical networks. More particularly, my invention relates to methods and apparatus for performing dynamic reconfiguration migration of these networks from a current topology to a new topology.

2. Description of the Background

It appears that an important component of the next generation Internet will be IP over wavelength division multiplexing optical fiber networks (i.e., IP/WDM). WDM, a parallel transmission technology using sliced non-overlapping wavebands (i.e. wavelength channels) within a fiber, is used to explore the bandwidth of existing fiber networks. Each WDM channel provides high bandwidth, operates asynchronously and in parallel, and can operate at different rates and carry different data formats. IP is a main driver in today's successful Internet and provides a common traffic convergence layer for all types of applications. The convergence of these two technologies can provide many advantages.

One of the emerging IP/WDM architectures is IP over reconfigurable WDM (hereinafter referred to as IRW networks). Reconfigurable WDM networks comprise optical WDM add/drop multiplexers (OADM) and optical wavelength cross-connects (OXC) interconnected, for example, by an optical fiber mesh network. Communications through these networks are conducted over bi-directional circuit-switched connections consisting of wavelength lightpaths. Because of the circuit-switched capability, these WDM networks are highly reconfigurable. Traditionally, IP networks have been comprised of routers and fixed physical links statically interconnecting the interfaces of these routers. In this context, reconfigurable WDM networks acted as high bandwidth transport networks providing point to point interconnection between geographically disperse IP networks. In IRW networks, the IP and WDM technologies are converged and the WDM network acts as the core of the IP network providing the interconnection between the routers. In other words, a WDM network supports a virtual IP network, the router interfaces now being interconnected by circuit-switched lightpaths.

By converging these two technologies, IRW networks consist of two layers: the IP layer and the WDM layer. There are several models on how these two layers can be physically combined in the IRW architecture. The overlay model is one such model and an exemplary overlay network is shown in FIG. 1. This network comprises IP routers 110 and a reconfigurable WDM network 112, consisting of OXCs and wavelength add-drop multiplexers (WADMs) 115 interconnected by optical fibers 116. IP routers 110 are physically connected to WADMs 115 through physical links 118. A virtual IP network 120 comprises virtual connections 122 (shown by the dashed lines) interconnecting the IP routers 110, which virtual connections are formed through circuit-switched lightpaths established in the physical WDM network 112. In this arrangement, the WDM layer behaves like a server network to the IP layer. Management and control of the two layers remain separate, with well-defined interaction interfaces between them. A further description of this technology can be found in, IETF Internet draft, "IP Over Optical Networks: A Framework", by Rajagopalan et. al. (this latter document can be obtained from the IETF).

An advantage of IRW networks is that the resulting virtual IP topology is reconfigurable because the circuit-switched lightpaths of the physical WDM network are reconfigurable. In other words, the same physical WDM fiber topology can support a number of lightpath topologies and therefore a number of virtual IP topologies. As result, IP traffic engineering can be performed through traditional management mechanisms, used for fixed IP topologies, and also through dynamic adaptation/reconfiguration. In addition, because of the nature of the WDM network, reconfiguration can be performed while the network is operating and transporting end user traffic.

Of concern here is this ability to perform dynamic reconfiguration, and in particular, how to dynamically migrate the current virtual IP topology to a new topology while minimizing the effect on the end user. As is further described below, an IRW traffic engineering system comprises reconfiguration triggers, which are policies that determine when a network reconfiguration should be performed, and topology design algorithms, which determine new virtual IP network topologies given specific objective functions and traffic distributions. However, once a new virtual IP topology is determined, the physical network must be reconfigured/ migrated to realize that topology. Reconfiguration migration comprises establishing and taking down individual lightpath connections and reconfiguring the IP routers in a particular sequence such that the old network topology is removed and the new network topology is realized. Because the WDM network, IP connections, and IP router interfaces are being physically modified, dynamic topology migration significantly affects the end user traffic. Hence, migration schemes are needed to minimize this impact.

In general, IP virtual topology networks and the traffic engineering of these networks are not new; in particular, ATM networks are used to transport IP. However, these networks are viewed as static networks. In other words, migrating a virtual network topology means completely breaking down the network system, interrupting service, configuring the new network, and then re-establishing service. As a result, topology reconfiguration in static overlay networks, like IP over classical ATM, is rarely performed.

SUMMARY OF MY INVENTION

Accordingly, it is desirable to provide a method and system to dynamically perform virtual IP topology reconfiguration migration for IRW networks that do not first take down the network and that minimize the impact on end users, thereby overcoming the above and other disadvantages of the prior art. In accordance with my invention, an IRW traffic engineering management system dynamically migrates a first virtual IP topology to a second virtual IP topology with the objective of minimizing the impact on the end users by maximizing network connectivity during the migration and by minimizing the effect on the heavier traffic loads during the migration.

Specifically, in accordance with a first embodiment of my invention, the current and new virtual IP topologies are first compared and a determination is made as to the virtual connections that need to be created and removed to realize the new topology. Next, a sequence in which each of these virtual connections will be added to and removed from the physical network is determined. Specifically, in step one, two virtual connections are selected to be removed from the network, wherein the selected connections are chosen using three criteria: first, the selected connections upon removal should leave the network in a fully connected state, second, the selected connections should have uncommon start and end nodes, and third, the selected connections should be least loaded connections. The two selected virtual connections are then removed from the physical IRW network.

In step two, virtual connections are selected and added to the network based on nodal and wavelength constraints. Specifically, if the physical resources of the IP routers and WDM network can support the connection, the connection is selected for addition. All selected connections are then provisioned in the physical network.

In step three, one virtual connection is selected to be removed from the network, wherein the selected connection is chosen using two criteria: first, the selected connection upon removal should leave the network in a fully connected state, and second, the selected connection should be the least loaded connection. The selected connection is then removed from the physical IRW network.

Finally, in step four, virtual connections are added and removed to and from the network through the iterative repetition of steps two and three. In general, during migration, a log file is maintained to track the actions taken to the original topology, e.g., removing/adding virtual connections and the connection details. In the event a virtual connection cannot be added to the network (i.e., a migration failure) the original virtual topology is restored through use of the log file.

In a second embodiment of my invention, the first step of the first embodiment is replaced with butterfly switching. Specifically, an attempt is first made to select combinations of two dequeue edges and two enqueue edges, subject to certain connectivity and physical resource constraints, and to remove/add these combinations from/to the physical network. As many combinations of dequeue and enqueue edges that meet the constraints are selected during this first step and added/removed to/from the network. Operation then proceeds with the second, third, and fourth steps as described for the first embodiment.

In general, note that existing connections need to be removed before new connections can be established. This is because in operational networks, WDM resources are too expensive to be left unconnected by carriers. This also infers that carriers try to reconfigure/restructure the existing WDM network before physically updating the network capacity.

DESCRIPTION

My invention comprises methods for performing reconfiguration migration to transform an IRW network from a first virtual IP topology to a second topology. My inventive methods are relevant to a larger traffic engineering management system. Such a system is first briefly described below to provide a context for understanding my invention. Both the traffic engineering system and my invention in particular will be described in relation to an overlay IRW architecture; however, my invention is also applicable to other IRW architectures and management systems.

Figure 1:
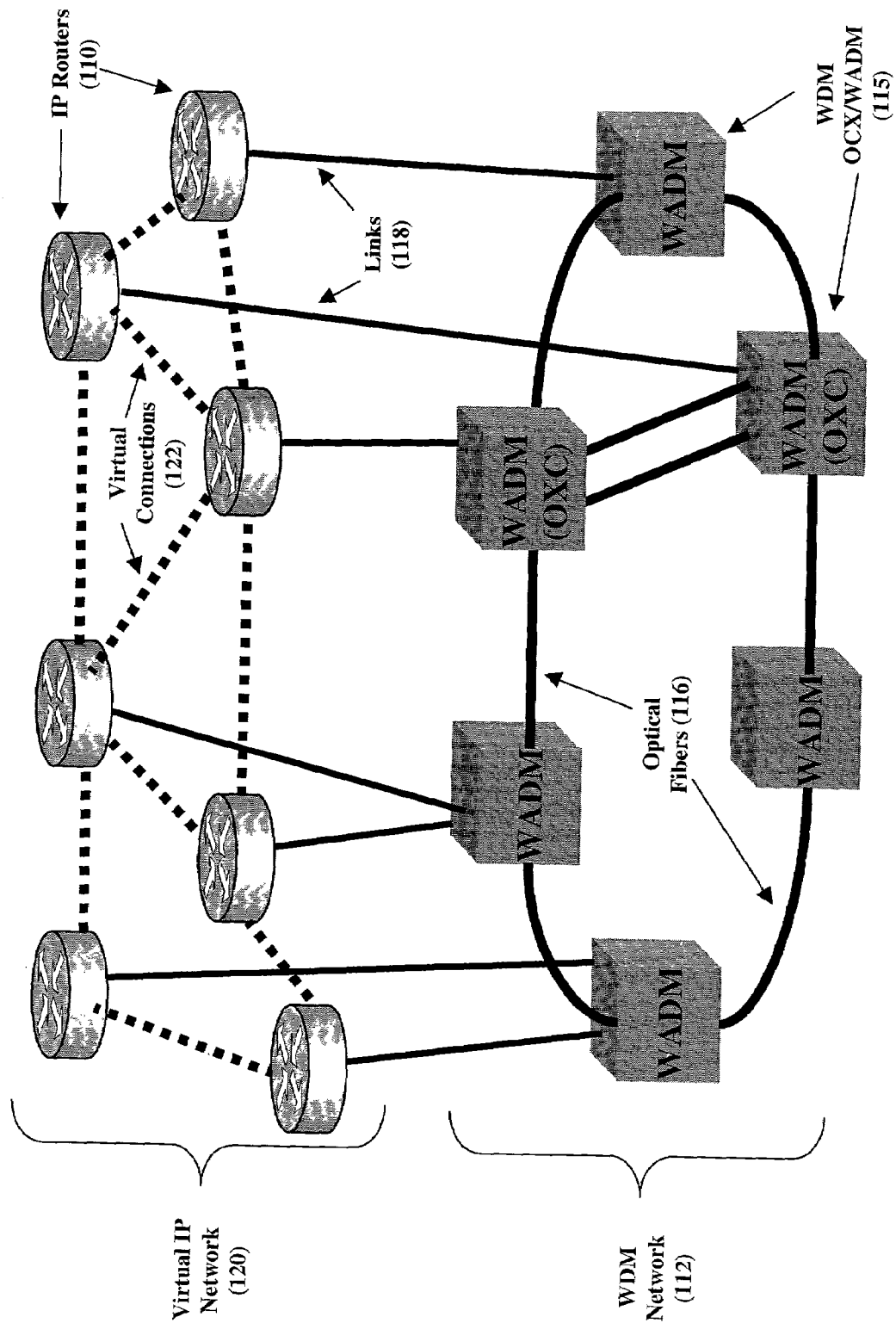
FIG. 1 depicts an IP over reconfigurable WDM network architecture, to which my invention is applicable.
Figure 2:
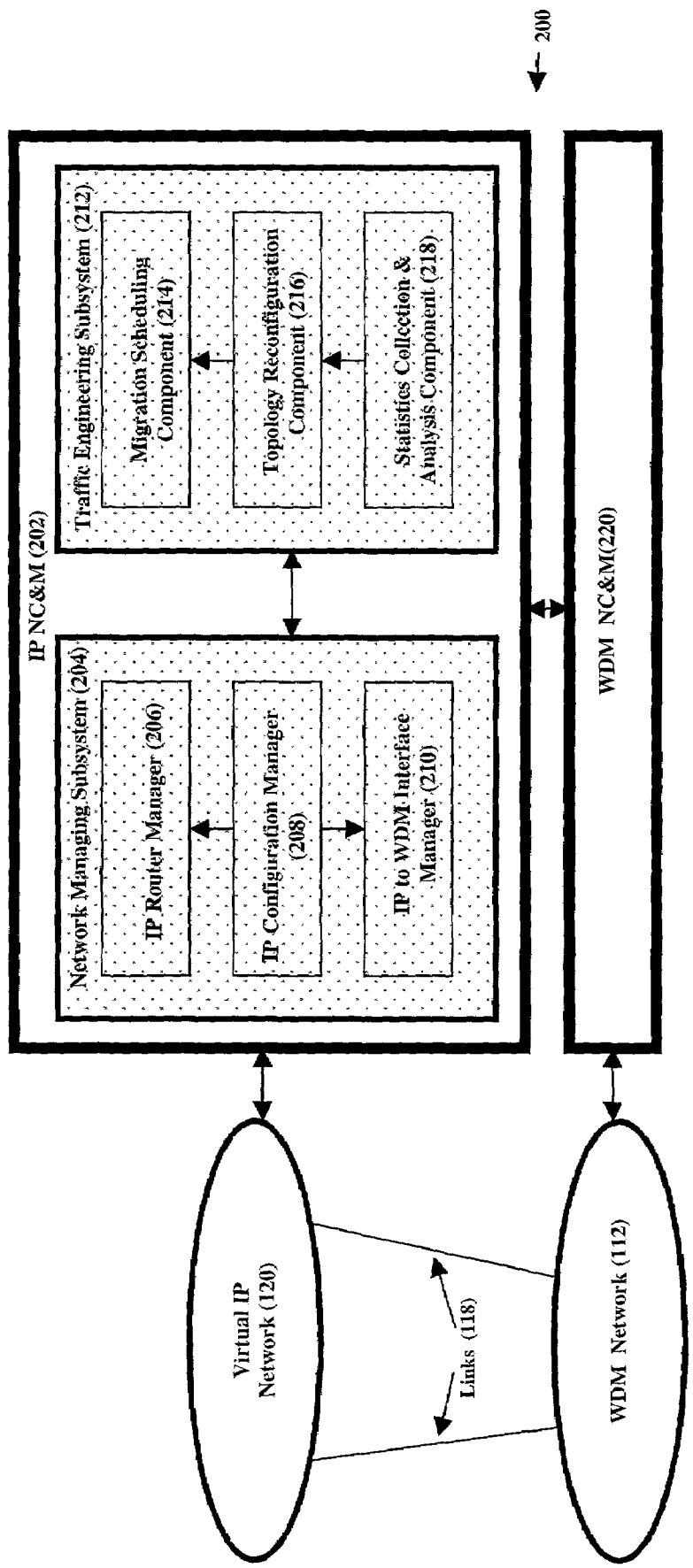
FIG. 2 depicts a functional illustration of an IP over reconfigurable WDM traffic engineering management system for determining new virtual IP topologies and for migrating the current IP topology to these new IP topologies, my invention being applicable to the migration functionality.

An exemplary traffic engineering management system 200 is shown in FIG. 2. Because the overlay IRW network functions as a client server architecture, with the IP layer requesting transport services from the WDM layer, traffic engineering management system 200 comprises both an IP network control and management system (NC&M) 202 and a WDM NC&M 220, where the former manages the virtual IP network 120 and the latter manages the physical WDM network 112.

Beginning with the IP NC&M 202, it comprises a traffic engineering subsystem 212 and a network managing subsystem 204. The traffic engineering subsystem further comprises a statistics collection and analysis component 218, a topology reconfiguration component 216, and a migration scheduling component 214, this latter component being the focus of my invention. The statistics collection and analysis component 218 communicates with the IP routers of IP network 120 (through the simple network management protocol (SNMP) for example) and is responsible for monitoring the IP network and collecting traffic statistics, determining traffic patterns and future traffic projections, and for setting performance thresholds. Upon determining that a new topology is required, the statistics collection and analysis component 218 triggers the topology reconfiguration component 216, which determines a new virtual IP topology based on reconfiguration objective(s). The newly determined topology is next passed to the migration scheduling component 214, which determines a series of migration steps to reconfigure the network from the current to the new topology. Each determined migration step corresponds to the setting up or tearing down of a virtual connection, which is equivalent to the setting up or tearing down of a WDM lightpath and to the reconfiguring of the IP router interfaces to which the lightpath corresponds. As such, as each migration step is determined, the topology reconfiguration component passes the migration step to the network managing subsystem 204 for execution.

The network managing subsystem 204 comprises an IP to WDM interface manager 210, an IP configuration manager 208, and an IP router manager 206. The IP to WDM interface manager 210 maintains the health of the IP to WDM access links 118 and provides address mapping between the IP layer and WDM layer.

The IP configuration manager 206 maintains the configuration of the current virtual IP topology, which is required for determining the migration scheme, as described below, and provides routing capability in the packet switched IP network. The configuration manager includes IP routing protocols, e.g. OSPF. The IP configuration manager also executes the steps of the migration reconfiguration scheme produced by the migration-scheduling component. As indicated, each migration step affects a lightpath and a corresponding pair of IP routers. As such, the IP configuration manager communicates each reconfiguration migration step to the WDM NC&M 220 and to the IP router manager 206 in order to disable and enable a virtual connection.

Upon receiving a reconfiguration request from the IP configuration manager 208, the IP router manager 206 communicates with the affected routers to enable and/or disable the router interfaces corresponding to the underlying lightpath to be reconfigured. Note that as part of enabling a router interface, the IP router manager also needs to update the interface IP address. Traditionally, IP addresses are static and router interfaces belong to the same subnet. However, when a network is reconfigured, statically assigned IP addresses of neighboring routers may no longer correspond. Hence, the IP addresses of the interfaces may need to be updated. Changing IP addresses can have significant impact on network stability. Several ways are known to minimize this impact. One way is to assign multiple IP addresses to an interface, one address being the primary and several addresses being the secondary, where only one IP address is active at one time. A second solution is to use the unnumbered IP interface, as described in IETF "RFC 2328, OSPF Version 2," April 1998, where multiple physical interfaces share the same IP interface address (this document can be obtained from the IETF).

Although the WDM NC&M 220 performs other functions, for the purposes of this discussion it can perform lightpath creation and deletion in accordance with the topology migration commands received from IP NC&M 202. Upon receiving a reconfiguration command, the WDM NC&M 220 communicates with the appropriate WDM network elements to delete/create a lightpath. In general, IP networks require bi-directional connectivity between routers. Hence, a virtual IP connection is implemented using two unidirectional WDM lightpaths, each of which follows the same fiber route but uses a different wavelength channel. As such, requests for lightpath deletion/creation occur in pairs.

Figure 3A:
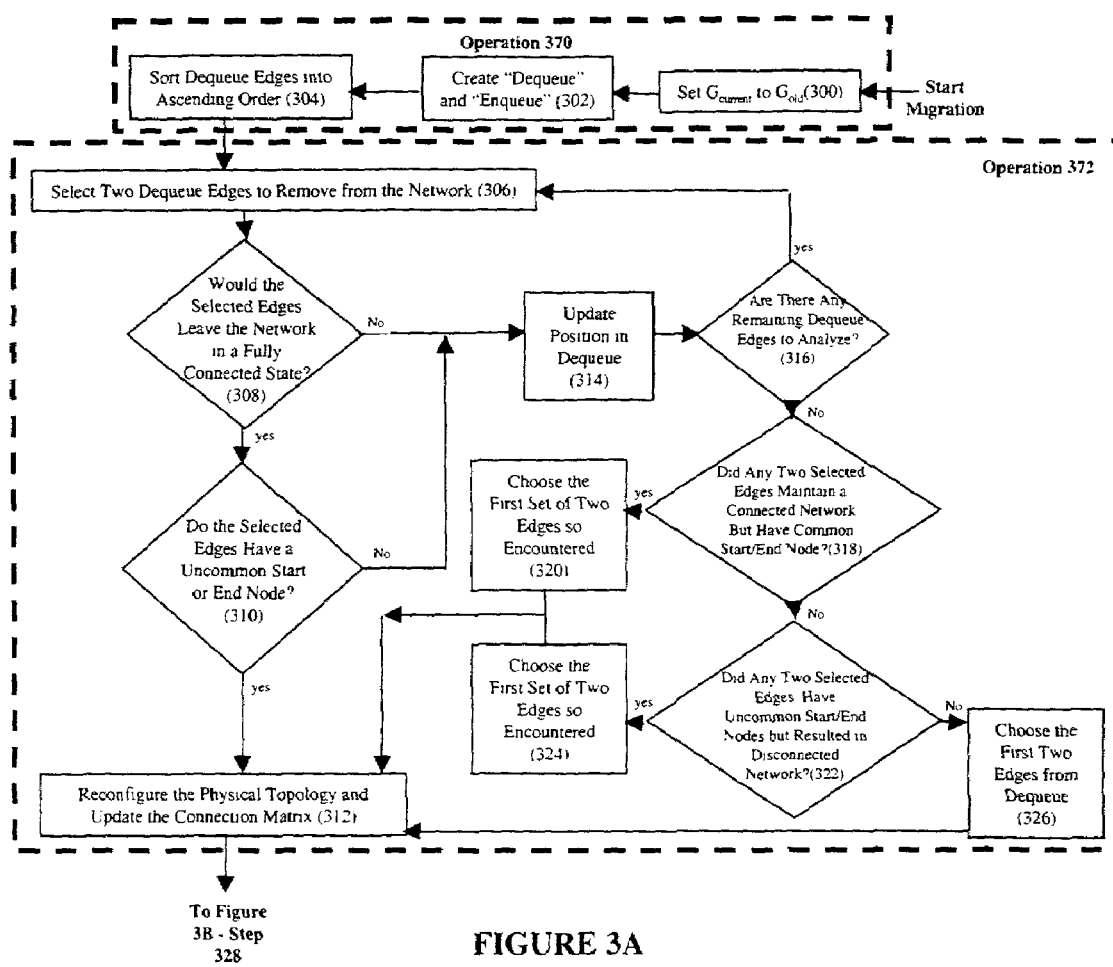
FIGS. 3A and 3B depict a first illustrative embodiment of my invention for determining a migration sequence for dynamically migrating a virtual IP network from a first topology to a second topology, which determination method attempts to minimize end user impacts by maximizing network connectivity and by minimizing the effect on the heavier traffic loads.
Figure 3B:
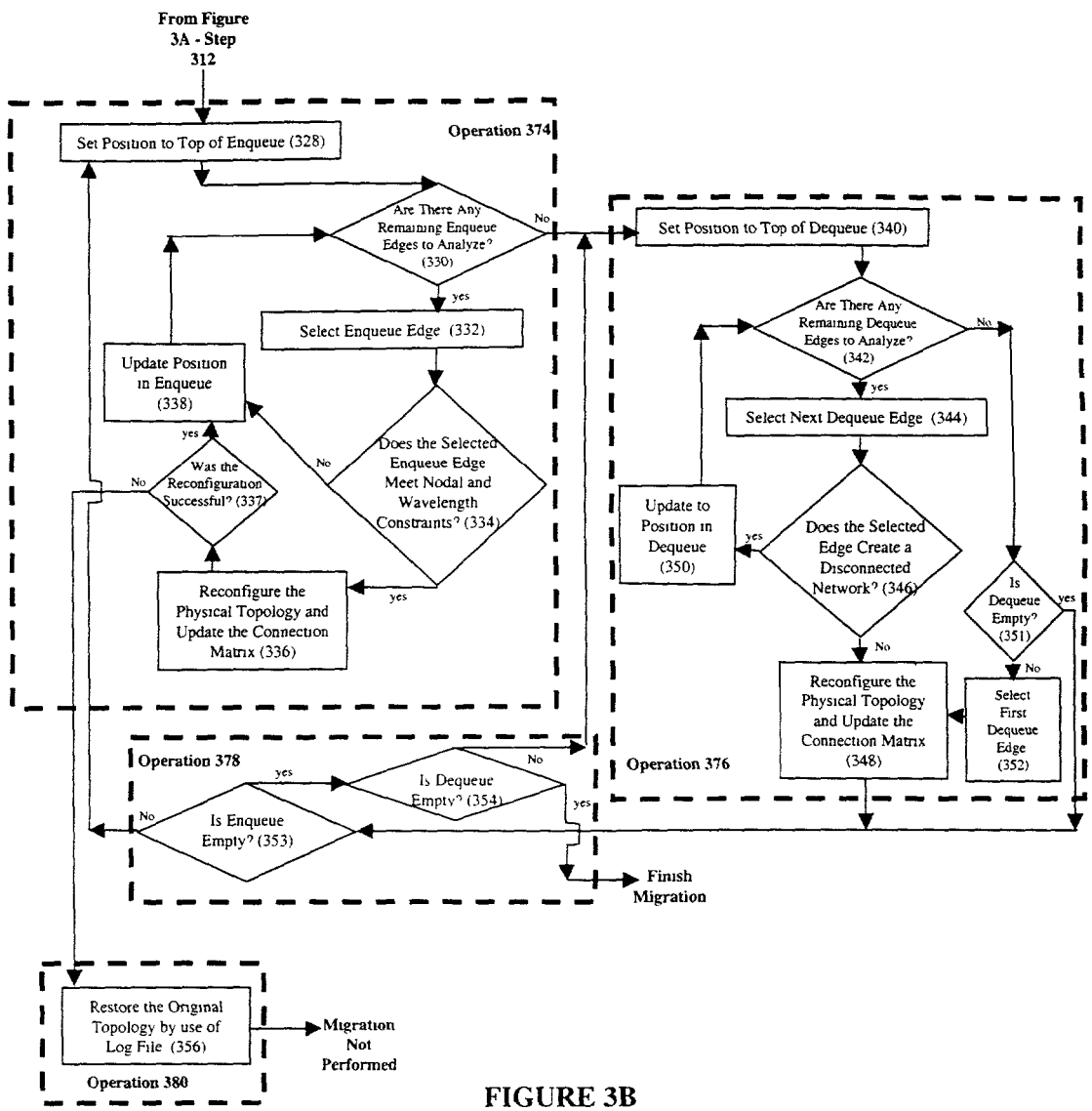

Turning to FIGS. 3A and 3B, a first embodiment of my inventive method for topology reconfiguration migration as performed by the migration scheduling component 214 is shown. My inventive method requires several input parameters (matrices $G_{old}$, $G_{new}$, and T, an input vector D, as described below) and is conducted in accordance with several constraints (nodal and wavelength migration constraints), each of which is first described followed by a description of the migration method. In particular, the input parameters and constraints are directed at maintaining a fully connected network during the migration and at maximizing the one-hop traffic during the migration (further discussed below), two objectives of my invention Beginning with $G_{old}$, it is a N×N matrix that contains the directed graph corresponding to the current virtual IP topology. The matrix rows and columns represent the N IP routers of the network and the matrix elements represent the virtual connections (also referred to as edges) of the virtual IP network; specifically, $G_{old}(i,j)$ is 1 if there is a virtual connection between routers i and j, and is 0 otherwise. As indicated above, IP networks generally require bi-directional connectivity between routers and as such, $G_{old}$ (and similarly $G_{new}$ and $G_{current}$) is a symmetrical matrix. The migration scheduling component 214 obtains $G_{old}$ from the IP configuration manager 208, which maintains the current IP topology. Similar to $G_{old}$, $G_{new}$ is a N×N matrix that represents the directed graph corresponding to the new IP topology produced by the topology reconfiguration component 218. By comparing $G_{old}$ and $G_{new}$, the edges that need to be added and deleted to migrate the virtual IP topology from $G_{old}$ to $G_{new}$ can be determined. $G_{current}$ is a temporary matrix used during the migration and represents the intermediate status of the virtual IP topology as the network is migrated from $G_{old}$ to $G_{new}$.

Matrix T is a N×N traffic demand matrix where each element T(i, j), where $T(i,j) \geq 0$, $\forall \{i, j\} \subset N$, is the volume of traffic in unit of time flowing over the virtual connection from router i to router j. In general, matrix T is not symmetrical because the flow from router i to router j will not be the same as the flow from router j to router i. In addition, T(i,j) and T(j,i) represent a complete edge between routers i and j. T can be obtained from the statistics collection and analysis component 218. The purpose of T is to achieve the one-hop objective of my invention as mentioned above. In particular, each time a virtual connection between two IP routers is removed during the migration, user nodes passing communications traffic through that connection are disrupted because the traffic must be rerouted through another portion of the network. To help minimize the migration effect on the user nodes, it is desirable to leave the heavier burdened connections towards the end of the migration. This migration method helps to ensure that heavy traffic loads are not constantly being disrupted and rerouted throughout the migration. I refer to this objective as maximizing the one-hop traffic. T is used to determine which edges are heavily loaded and should be removed last.

Vector D is an N element nodal degree vector where each element D(i), where D(i), $\forall \{i\} \subset N$, is the nodal degree of router i. D can be obtained from the statistics collection and analysis component 218. The purpose of D is further described below.

Turning to the nodal and wavelength constraints, these constraints are directed at the network connectivity objective of my invention. As indicated, the migration scheduling component 214 determines a sequence of steps for setting-up and tearing down virtual connections in accordance with my invention. The IP configuration manager 208 as described above then performs each step. In particular, however, simply choosing a virtual connection to add does not guarantee that this connection can be physically provisioned; the physical IP routers corresponding to the new connection may not have available interfaces 118 to the WDM network 112, and the WDM network may not have available wavelengths to support a new lightpath. As a result, the migration-scheduling component may designate a virtual connection to add, but the provisioning of the connection may be delayed until resources become available. To overcome this issue and to meet the connectivity objective, my inventive migration methodology tries to ensure that a virtual connection can be physically provisioned before designating the addition of this virtual connection. This connectivity objective is met by applying several constraints: the nodal degree constraints that ensure the routers corresponding to the new virtual connection have available interfaces, and the wavelength constraints that ensure the WDM network can support a new lightpath. It is assumed the constraints information is available and accurate. For example, in IP controlled networks, the constraints can be collected using OSPF.

The nodal degree constraints are defined as:

$$\sum_i G_{current}(i,j) \le D(j), \forall\, j \quad (1)$$

$$\sum_i G_{current}(j,i) \le D(j), \forall\, j \quad (2)$$

$G_{current}$ reflects the status of the network topology with the new virtual connection inserted. Constraints (1) and (2) are determined for both IP routers to which the new virtual connection interfaces. If the inequalities hold true, the network resources can support the new connection.

The wavelength constraints are defined as:

$$\sum_{0<k<n} \lambda^k_{xy} \le \lambda_{xy}, \forall\, (x,y) \quad (3)$$

$$\lambda^k_{xy}(i,j) \le 0, \forall\, (x,y) \quad (4)$$

$\lambda_{xy}$ represents the number of wavelengths between WDM nodes x and y, $$\lambda^k_{xy}$$

indicates the wavelength availability between WDM nodes x and y on the wavelength k, and $$\lambda^k_{xy}(i,j)$$

is the wavelength indicator for $$\lambda^k_{xy}$$

on the virtual path between node i and j. The wavelength indicator is the set {0, 1}, where 1 means wavelength in use and 0 refers to free wavelength channel. Constraint (3) indicates that the number of wavelength channels available per WDM node pair (x, y) is limited to the number of wavelengths that can be physically supported. Constraint (4) indicates whether there are available wavelengths to construct a virtual lightpath between IP nodes i and j. If wavelength interchanges can be provided by intermediate nodes, an alternate wavelength can be used only to avoid congestion. The rule of thumb is to use the primary wavelength and minimize the number of wavelength interchanges. Constraints (3)–(4) can be obtained from/through the WDM NC&M 220.

Turning to the steps of my inventive reconfiguration migration method as shown in FIGS. 3A and 3B, operations 370–380 are the primary steps of the migration. In operation 370, initialization is performed including the creation of two queues, enqueue and dequeue, that contain the edges (i.e., virtual connections) to be added and removed, respectively, from the old network topology to achieve the new network topology. In operation 372, two dequeue edges are initially selected and removed from the physical network. In operation 374, enqueue is completely traversed and all edges that satisfy the nodal and wavelength constraints (1)–(4) are provisioned in the physical network. In operation 376, dequeue is traversed and the first encountered edge whose removal does not result in a disconnected network is selected and removed from the physical network. Finally, operation 378 continuously executes operations 374 and 376 until enqueue and dequeue are empty, resulting in a completed network migration. In the event operation 374 is not successful in provisioning a selected enqueue edge, migration is halted and operation proceeds to operation 380, where the original network topology is restored through use of a log file.

Beginning with operation 370, initialization steps are performed. First, $G_{current}$ is initialized to $G_{old}$ in step 300 to assist in managing the migration. Next, two queues, dequeue and enqueue, are constructed in step 302 by comparing $G_{old}$ and $G_{new}$. Enqueue is a list of the edges (i.e., virtual connections) that need to be added to migrate from $G_{old}$ to $G_{new}$ and dequeue is a list of the edges that need to be removed to migrate from $G_{old}$ to $G_{new}$.

Using the traffic demand matrix T, the dequeue edges are next arranged in step 304 in ascending order. As indicated above, each edge has two entries in T and therefore two traffic demands, one for each direction of the virtual connection. The edge sorting in step 304 is based on the larger traffic demand for each edge. In general, the ordering of edges in dequeue dictates the order in which the subsequent operations will remove the edges from $G_{old}$ to achieve $G_{new}$. Overall, removing edges from the top of dequeue is directed at the "maximizing one-hop traffic" objective.

Moving to operation 372, two edges are selected from dequeue and removed from the physical network, the selection of the two edges being subject to several objectives/constraints: first, the selected edges upon removal should leave the network in a fully connected state, second, the selected edges should have uncommon start and end nodes, and third, the selected edges should be the least loaded edges (i.e., try and select two edges from the top of dequeue). As such, beginning with step 306, the first two edges are selected from dequeue. In step 308 these two edges are tested to determine if their removal leaves the network in a fully connected state. Fully connected is defined as starting from any IP node and being able to travel to any other node. Removing the two edges from $G_{current}$ and performing the Depth-First-Search algorithm, for example, can make this determination. If the removal of the two edges results in a fully connected network, the two edges are next examined in step 310 to determine if they have a common start or end node. This determination can be made by examining $G_{old}$, for example. If the two edges have uncommon start and end nodes, the two edges are removed from the physical network in step 312 (further described below) and operation 372 is complete.

However, if the two edges result in either a disconnected network or have a common start/end node, a different combination of two edges is chosen from dequeue. Specifically, in step 314 the position in dequeue is updated and a determination is then made in step 316 as to whether all combinations of dequeue edges have been examined (i.e., if true, no two edges satisfied the criteria of steps 308 and 310). Assuming there are remaining edges to examine, dequeue is sequentially searched to locate two edges. The search includes selecting one edge from the top of dequeue and searching the rest of dequeue for another edge, the combination of which must satisfy/match the 308 and 310 criteria.

If a match cannot be found, the next edge from the top of dequeue is selected and dequeue is again searched for another edge, the combination of which must satisfy/match the 308 and 310 criteria. As such, the first selected edge is always less loaded than the second searched-for edge. If the two criteria are met, the two edges are removed from the network in step 312 and operation 372 is complete. If either criteria/step 308 or 310 fails, two additional edges are again chosen in steps 314, 316, and 306, which steps are continuously executed searching for two edges that meet the criteria of steps 308 and 310. If all dequeue combinations are searched and no two edges are found, step 316 moves to step 318, where the connectivity and common node criteria of steps 308 and 310 are loosened in order to find two edges to remove from the network.

Specifically, in step 318 a determination is made as to whether any combination of dequeue edges priorly examined resulted in a fully connected network but had a common start or end node. If a combination of two edges satisfies this criteria, the first encountered combination is selected in step 320 and the two edges are removed from the physical network in step 312 and operation 372 is complete. If step 318 fails, operation proceeds to step 322 where a determination is made as to whether any combination of dequeue edges priorly examined had uncommon start and end nodes but resulted in a disconnected network. If a combination of two edges satisfies this criterion, the first encountered combination is selected in step 324 and the two edges are removed from the physical network in step 312. Finally, if step 322 fails, no two edges exist that leave the network in a fully connected state and that have uncommon start and end nodes. As such, operation proceeds to step 326 where the first two edges from dequeue are selected and removed from the physical network in step 312, ending operation 372.

As described, step 312 results in the actual removal of the selected two edges from the physical network. Specifically, in step 312 the migration scheduling component 214 conveys the two selected edges to the IP configuration manager 208 for removal. As described above, the IP configuration manager communicates with the IP route manager 206, which configures the two corresponding IP router interfaces down, and communicates with the WDM NC&M 220, which takes down the two corresponding unidirectional lightpaths in the WDM layer. Finally, $G_{current}$ is updated to reflect the current state of the network.

Moving to operation 374, the entire enqueue is traversed and any edges that can satisfy the nodal and wavelength constraints of equations (1)–(4) are added to the network. Specifically, in step 328 the enqueue position is set to the top and a determination is made if the queue is empty in step 330. Assuming the queue is not empty, an enqueue edge is selected in step 332. Before provisioning this edge however, a determination is made in step 334 as to whether the IP and WDM network resources can support the new edge (i.e., are constraints (1)–(4) met). As for the wavelengths constraints (3)–(4), the WDM NC&M 220 is required to make this determination since it maintains the requisite information. The migration scheduling component 214 can directly communicate with the WDM NC&M or indirectly communicate with the WDM NC&M through the use of network managing subsystem 204. As for the nodal constraints (1)–(2), the migration scheduling component 214 can directly make this determination once vector D is updated with the current IP router status, information that can be obtained by querying the routers or by querying internal IP NC&M databases. If the wavelength and nodal constraints are met, operation proceeds to step 336 where the new edge is provisioned (discussed further below).

If the wavelength and nodal constraints of equations (1)–(4) are not met in step 334 or if the constraints are met and the edge is successfully provisioned in steps 336 and 337, operation proceeds to step 338 to determine if another edge can be migrated to the new topology. Specifically, the position in enqueue is first updated in step 338 and a determination is then made in step 330 as to whether the entire enqueue has been traversed. Assuming enqueue is not empty, another edge is selected in step 332, a determination is made in step 334 as to whether the physical network can support the edge, and the edge is provisioned if the constraints are met. This process continues until the entire enqueue is traversed. Operation then proceeds to operation 376.

As described, step 336 provisions any edge selected in operation 374. Specifically, in step 336 the migration scheduling component 214 conveys the selected edge to the IP configuration manager 208 for provisioning. The IP configuration manager communicates with the IP route manager 206, which configures the two corresponding IP router interfaces up and updates the interface IP addresses using methods like those described earlier. The IP configuration manager also communicates with the WDM NC&M 220, which computes a new fiber route for a new lightpath and then sets up this new lightpath. Finally, $G_{current}$ is updated to reflect the current state of the network and operation proceeds to step 337 to verify that the new lightpath was successfully provisioned. Specifically, it is possible that the lightpath configuration will not be successful in step 336 (e.g. a fiber link is broken or virtual paths cannot be established due to WDM layer constraints). In this event, migration must be stopped and the original network topology must be restored. To assist in this process, a log file is maintained throughout the migration (i.e., the addition and removal of edges). This log can be maintained by the network managing subsystem 204 or by the traffic engineering subsystem 212. As such, in the event of a failure, operation proceeds from step 337 to operation 380 step 356, where the log file is read and the migration actions are reversed. Finally, an error is issued indicating that the virtual topology could not be supported in the current physical WDM network.

Assuming edges are successfully added in operation 374, operation proceeds to operation 376, where one dequeue edge is removed from the old topology wherein the selected edge preferably leaves the network in a fully connected state and is the least loaded edge. Specifically, in step 340 the dequeue position is set to the top and a determination is made if the queue is empty in step 342. Assuming the queue is not empty, a dequeue edge is selected in step 344. A determination is then made as to whether the removal of the selected edge leaves the network in a fully connected state. Removing the edge from $G_{current}$ and performing the Depth-First-Search algorithm, for example, can make this determination. If the removal of the edge results in a fully connected graph, the edge is removed from the physical network in step 348 (this step is similar to step 312 described above), $G_{current}$ is updated to reflect the current state of the network, and operation proceeds to operation 378. If the edge removal results in a disconnected graph, operation proceeds to determine if a different edge can be removed from the old topology. Specifically, the position in dequeue is first updated in step 350 and a determination is then made in step 342 as to whether the entire dequeue has been traversed. Assuming dequeue is not empty, another edge is selected in step 344, a determination is made in step 346 as to whether the edge leaves the network in a fully connected state, and if so, the edge is removed. This process continues until either an edge is removed in step 348 or the entire dequeue is traversed in step 342 (i.e., no edge was found). If no edge is found upon searching the entire dequeue, operation proceeds from step 342 to steps 351 and 352 where, if there are still edges in dequeue, the first edge is selected and then subsequently removed from the network in step 348. Operation then proceeds to operation 378. If there are no remaining dequeue edges in step 351, operation proceeds directly to operation 378.

Operation 378 consecutively loops the migration method back through operations 374 and 376 until both enqueue and dequeue are empty, as determined by steps 353 and 354. Once both queues are empty, the topology migration from $G_{old}$ to $G_{new}$ is complete. Again, the advantage of my inventive reconfiguration migration method is that a virtual IP topology can be dynamically migrated to a new topology while minimizing the network impact on the end users, which minimized impact includes maximizing network connectivity and minimizing the impact on the heavier traffic communications.

Figure 4A:
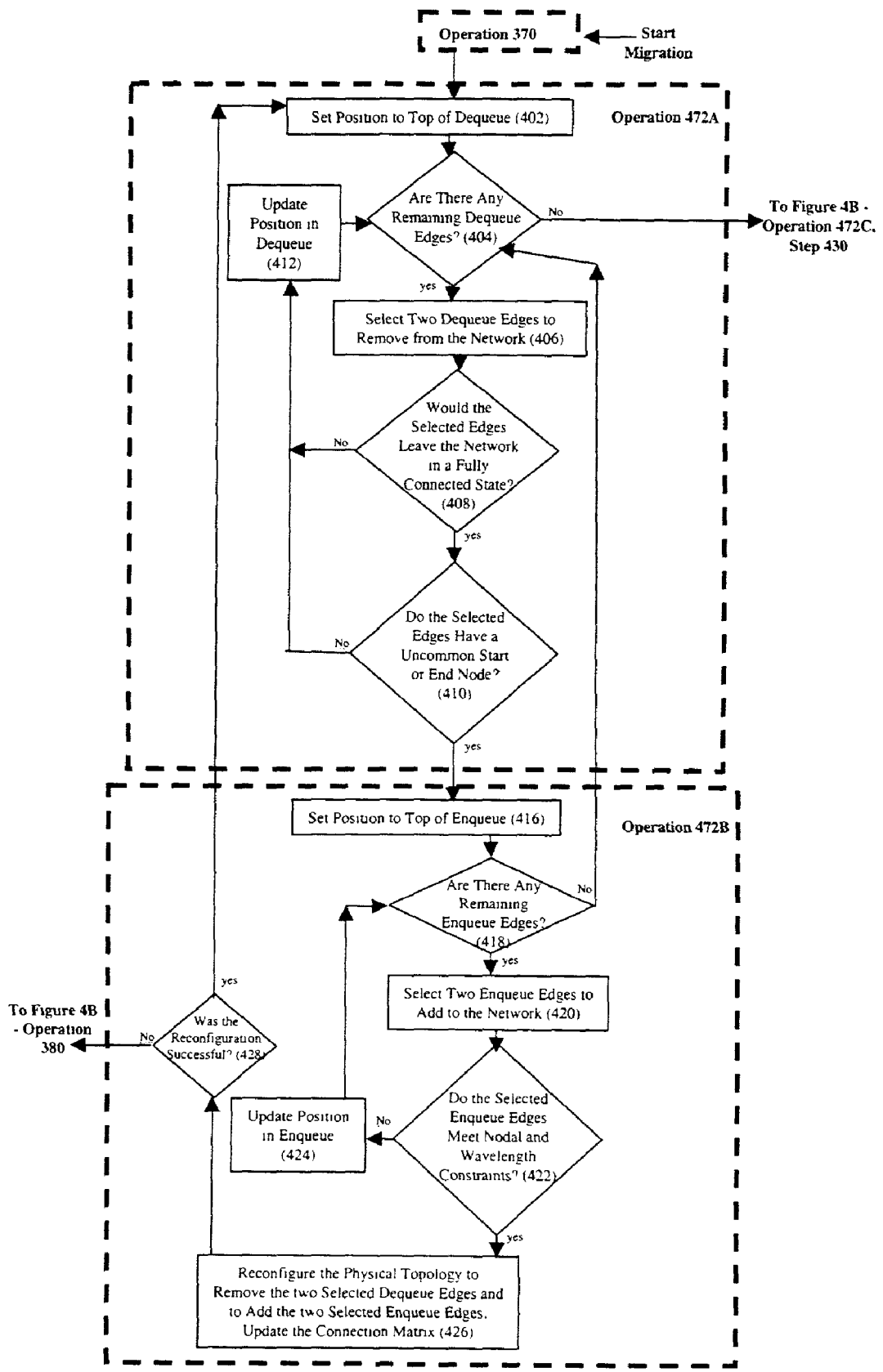
FIGS. 4A and 4B depict a second illustrative embodiment of my invention for determining a migration sequence for dynamically migrating a virtual IP network from a first topology to a second topology, this second embodiment being similar to the first embodiment with the change that butterfly switching is first performed.
Figure 4B:
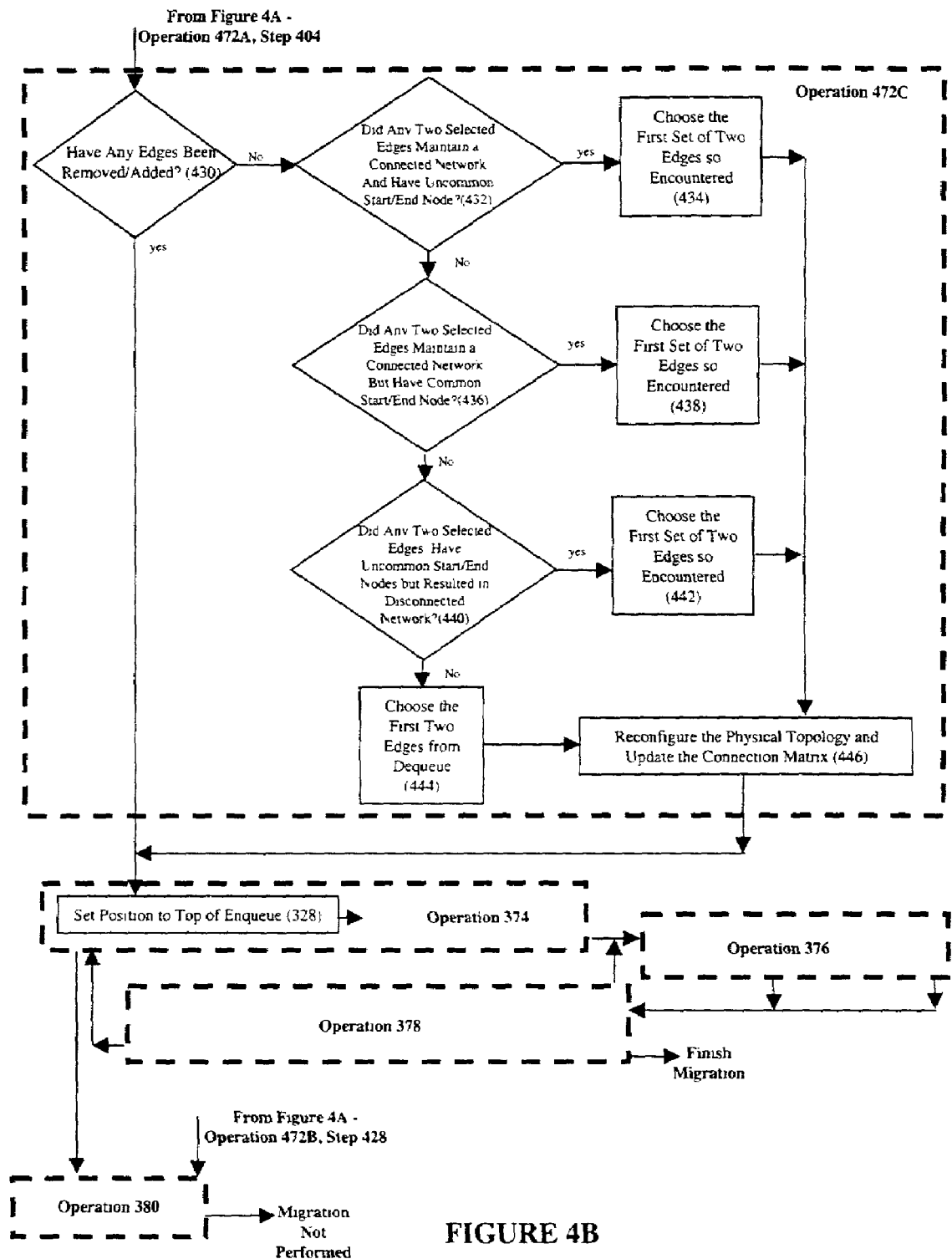

FIGS. 4A and 4B show a second embodiment of my inventive reconfiguration migration method. This embodiment is similar to the first embodiment with the change that "butterfly switching" is first performed. Specifically, an attempt is first made to select combinations of two dequeue edges and two enqueue edges, subject to certain constraints, and to remove/add these combinations from/to the physical network. These steps are shown in new operations 472A, 472B, and 472C, which replace operation 372 of the first embodiment. Operations 370, 374, 376, and 378 of this second embodiment are similar to the first embodiment.

Beginning with operation 472A, dequeue is searched in steps 404–412 for the selection of two edges. The choice of the two edges is based on the same objectives/constraints as operation 372 of the first embodiment: the selected edges upon removal should leave the network in a fully connected state, the selected edges should have uncommon start and end nodes, and the selected edges should be the least loaded edges. If two edges cannot be found that meet the constraints, step 404 moves to operation 472C (discussed below), where operation proceeds similar to the first embodiment. If two edges are found, rather than remove these two edges from the network, operation proceeds from step 410 to operation 472B. Here, enqueue is searched in steps 416–424 for the selection of two edges that collectively satisfy the nodal and wavelength constraints (1)–(4), taking into consideration that the two selected dequeue edges would first be removed. If two enqueue edges cannot be found that meet the constraints, operation proceeds from step 418 back to operation 472A step 404, where the search of dequeue is continued for two different edges that meet the connectivity and uncommon start/end node constraints. If two edges cannot be found, operation proceeds from step 404 to operation 472C. If two edges are found, operation proceeds from step 410 back to operation 472B step 416, where enqueue is again searched starting from the top for two edges.

If at any time two enqueue edges are found, operation proceeds from step 422 to steps 426 and 428 where the two selected dequeue edges are removed from the physical network and the two selected enqueue edges are added to the physical network, thereby performing a butterfly switch (Again, similar to the first embodiment, if an edge is not successfully added in step 426, the migration must be stopped and reversed, through the use of a log file. Step 428 makes this determination and forwards operation to operation 380, where the reversal is performed and migration ends.). Assuming there are no errors, operation then proceeds back to operation 472A to step 402, where the position in dequeue is set back to the top, and an attempt is made to find two additional dequeue edges and two additional enqueue edges to remove/add from the network, the selected edges being subject to the constraints of steps 408, 410, and 422. Again, each time a combination of two dequeue edges and two enqueue edges are found, the combination is removed/added from the network.

At some point, it will no longer be possible to find two dequeue edges that meet the constraints of steps 408 and 410. At this point, operation moves from step 404 to operation 472C, step 430. Operation 472C is similar to steps 318–326 of operation 372 in that if two dequeue edges have not yet been removed, then two edges are now selected for removal. Beginning with step 430, a determination is first made as to whether any edge combinations have been removed/added during operations 472A and 472B. If edges have been removed/added, operation 472C is complete and operation proceeds to operations 374–378, which operations are the same as the first embodiment. However, if no edges have been removed by the prior operations, operation proceeds to step 432, where a determination is made as to whether operation 472A ever found two dequeue edges that meet the constraints of steps 408 and 410 (e.g., it is possible that two dequeue edges were found that meet the constraints, but two corresponding enqueue edges could not be found and therefore no edge removals/additions were performed). If operation 472A found two dequeue edges, the first encountered combination is selected in step 434 and the two edges are removed from the physical network in step 446 and operation 472C is complete. If step 432 fails, operation proceeds to steps 436–444 for the selection of two edges, these steps being identical to steps 318–326 of the first embodiment, respectively. The two selected edges are then removed from the physical network in step 446 ending operation 472C. At the completion of step 446, operation proceeds to operations 374–380, which are similar to the first embodiment.

Although the above described embodiments of my invention were described with respect to IP over reconfigurable WDM networks, my invention in general is applicable to the reconfiguration migration of virtual topologies for any overlay network.

The above-described embodiments of my invention are intended to be illustrative only. Numerous other embodiments may be devised by those skilled in the art without departing from the spirit and scope of my invention.

APPENDIX

Definitions of Acronyms in the Specification:

ATM: Asynchronous Transfer Mode

IETF: Internet Engineering Task Force

IP: Internet Protocol

IRW: IP over Reconfigurable WDM Network

NC&M: Network Control and Management System

OADM: Optical WDM Add/Drop Multiplexers

OXC: Optical Wavelength Cross-Connect

OSPF: Open Shortest Path First

WDM: Wavelength Division Multiplexing

I claim:

1. A method for migrating a first virtual topology comprising a plurality of virtual connections over an overlay network, to a second virtual topology, said method comprising the steps of:
   a) comparing the first and second topologies to create an add queue of virtual connections to add to the first topology and a remove queue of virtual connections to remove from the first topology to realize the second topology,
   b) removing a combination of two remove queue virtual connections from the network,
   c) adding all add queue virtual connections to the network for which there are available network resources,
   d) removing one remove queue virtual connection from the network, and
   e) repeating steps c) through d) until the first virtual topology is migrated to the second virtual topology.

2. The method of claim 1 wherein step b) further comprises the steps of:
   f) searching the remove queue for combinations of two virtual connections,
   g) determining for each combination of virtual connections whether the combination satisfies a first criteria of leaving the network in a fully connected state if removed and a second criteria of having uncommon origin and destination points,
   h) if a combination satisfies both criteria, selecting that combination for removal and stopping the search, and
   i) if the entire queue is searched and no such combination is selected, selecting for removal two virtual connections in the remove queue.

3. The method of claim 2 further comprising, prior to step i), the steps of:
   j) if no combination satisfied both criteria but at least one combination satisfied the first criteria, selecting for removal one of said at least one combination of virtual connections that satisfied the first criteria, and
   k) if no combination satisfied both criteria and no combination satisfied the first criteria but at least one combination satisfied the second criteria, selecting for removal one of said at least one combination of virtual connections that satisfied the second criteria.

4. The method of claim 3 further comprising, after step a), the step of
   l) ordering the remove queue from top to bottom in ascending order based on traffic demands of each virtual connection in the queue, and
   wherein step f) searches the queue based on virtual connections with lesser traffic demands, wherein step i) selects the first two virtual connections in the queue, wherein step j) selects the first encountered combination of virtual connections that satisfied the first criteria, and wherein step k) selects the first encountered combination of virtual connections that satisfied the second criteria.

5. The method of claim 1 wherein step c) further comprises the step of:
   determining for each add queue virtual connection whether the network resources can support the virtual connection based on nodal and wavelength constraints.

6. The method of claim 1 wherein step d) further comprises the steps of:
   f) searching the remove queue for virtual connections,
   g) determining for each virtual connection whether connection satisfies a criteria of leaving the network in a fully connected state if removed,
   h) if a virtual connection satisfies the criteria, selecting that virtual connection for removal and stopping the search, and
   i) if no virtual connection satisfies the criteria, selecting for removal one virtual connection in the remove queue.

7. The method of claim 6 further comprising, after step a), the step of
   ordering the remove queue from top to bottom in ascending order based on traffic demands of each virtual connection in the queue, wherein the searching step f) starts from the top of the queue, and wherein the selecting step i) selects the first virtual connection in the remove queue.

8. The method of claim 1 wherein said removing and adding steps comprise reconfiguring WDM lightpaths in the network.

9. The method of claim 1 further comprising the steps of:
   maintaining a log file to track all add queue virtual connections added to the network and all remove queue virtual connections removed from the network, and
   if step c) does not successfully add an add queue virtual connection to the network, reversing the migration through the use of the log file and ending the migration.

10. A traffic management system for managing virtual topology over a reconfigurable network, wherein said system comprises a traffic engineering subsystem and a network managing subsystem, said traffic engineering subsystem comprising a topology reconfiguration component for determining new topologies and a migration scheduling component for determining a sequence of steps for migrating virtual connections of a current topology to virtual connections of a new topology, said migration scheduling component further communicating said migration steps to said network managing subsystem that interacts with the network to provision the new topology, said migration scheduling component executing the steps of:
    a) comparing the current and new topologies to create an add queue of virtual connections to add to the current topology and a remove queue of virtual connections to remove from the current topology,
    b) selecting a combination of two remove queue virtual connections,
    c) sending the selected combination of two virtual connections to the network managing subsystem for removal from the network,
    d) searching the entire add queue and selecting virtual connection for which there are network resources available to provision those connections,
    e) sending all selected add queue virtual connections to the network managing subsystem for addition to the network,
    f) selecting one remove queue virtual connection,
    g) sending the one remove queue virtual connection to the network managing subsystem for removal from the network, and
    h) repeating steps d) through g) until the add queue and remove queue are empty, resulting in a migration to the new topology.

11. The traffic management system of claim 10 wherein step b) further comprises the steps of:
    i) searching the remove queue for a combinations of two virtual connections that meet a first criteria of leaving the network in a fully connected state if removed and a second criteria of having uncommon start and end nodes, j) if a combination of virtual connections meets both criteria, selecting that combination and stopping the search, and k) if the entire queue is searched without selecting a combination of virtual connections, selecting two virtual connections in the remove queue.

12. The traffic management system of claim 11 further comprising, prior to step k), the steps of l) if no combination of virtual connections met both criteria, selecting a combination of virtual connections that met the first criteria, and m) if no combination of virtual connections met both criteria and no combination met the first criteria, selecting a combination of virtual connections that met the second criteria.

13. The traffic management system of claim 12 further comprising, after step a), the step of n) ordering the remove queue from top to bottom in ascending order based on traffic demands of each virtual connection in the queue, and wherein step i) searches the queue based on virtual connections with lesser traffic demands, wherein step k) selects the first two virtual connections in the queue, wherein step l) selects the first encountered combination of virtual connections that met the first criteria, and wherein step m) selects the first encountered combination of virtual connections that met the second criteria.

14. The traffic management system of claim 10 wherein step d) further comprises the step of:

determining for each add queue virtual connection whether the network resources can support the virtual connection based on nodal and wavelength constraints.

15. The traffic management system of claim 10 wherein step f) further comprises the steps of:

i) searching the remove queue for a virtual connection that meets a criteria of leaving the network in a fully connected state if removed, j) if a virtual connection meets the criteria, selecting the virtual connection and stopping the search, and k) if no virtual connection satisfies the criteria, selecting one virtual connection in the remove queue.

16. The traffic management system of claim 15 further comprising, after step a), the step of ordering the remove queue from top to bottom in ascending order based on traffic demands of each virtual connection in the queue, wherein the step i) of searching the remove queue starts from the top of the queue, and wherein the selecting step k) selects the first virtual connection in the remove queue.

17. The traffic management system of claim 10 wherein the network includes WDM lightpaths and said sending steps for addition and removal of virtual connections result in reconfiguration of WDM lightpaths.

18. The traffic management system of claim 10 wherein one of said network managing subsystem and said traffic engineering subsystem maintains a log file to track all add queue virtual connections added to the network and all remove queue virtual connections removed from the network, and if a selected add queue virtual connection from step e) is not successfully added to the network, said network managing subsystem executing the steps of reversing the migration through the use of the log file and ending the migration.

19. A method for migrating a first virtual IP topology comprising a plurality of virtual connections over a reconfigurable WDM network, to a second virtual IP topology, said method comprising the steps of:

a) creating an add set of virtual connections to add to the current topology and a remove set of virtual connections to remove from the current topology to realize the new topology, b) searching the remove set for combinations of two virtual connections that satisfy a first criteria of leaving the network in a fully connected state if removed and a second criteria of having uncommon start and end nodes, wherein the searching is based on virtual connections with lesser traffic demands, c) selecting for removal the first encountered combination of virtual connections that satisfies both criteria, d) if no combination satisfies both criteria, selecting for removal the first encountered combination that satisfies the first criteria, e) if no combination satisfies both criteria and no combination satisfies the first criteria, selecting for removal the first encountered combination that satisfies the second criteria, f) if no combination satisfies any of the criteria, selecting for removal the least loaded combination of virtual connections for removal, g) adding the edge selected for removal in steps b) through f) to a log file, wherein the log file is used to reverse the migration in the event of a migration failure, h) selecting for addition all add set virtual connections that satisfy nodal and wavelength constraints, i) adding the edges selected for addition in step h) to the log file, j) searching the remove set for one virtual connection that if removed, leaves the network in a fully connected state, wherein the virtual connections of the remove queue are searched from least to most traffic demand, k) selecting for removal the first encountered virtual connection that leaves the network in a fully connected state, l) if no virtual connection leaves the network in a fully connected state, selecting for removal the first virtual connection in the remove set, m) adding the edge selected for removal in steps k) through l) to the log file, and n) repeating steps h) through m) until the first virtual IP topology is migrated to the second virtual IP topology.

20. A method for migrating a first virtual topology comprising a plurality of virtual connections over a reconfigurable network, to a second virtual topology, said method comprising the steps of:

a) creating an add queue of virtual connections to add to the current topology and a remove queue of virtual connections to remove from the current topology to realize the new topology, b) searching the remove queue for a combination of two virtual connections that satisfy a first criteria of leaving the network in a fully connected state if removed and a second criteria of having uncommon start and end nodes, c) if a combination of remove queue edges is found, searching the add queue for a combination of two virtual connections for which there are available network resources, taking into consideration the removal of the remove queue combination, d) if a combination of remove queue edges is found and a combination of add queue edges is found, removing the remove queue combination from the network, adding the add queue combination to the network, and updating a position in the remove queue,
e) repeating steps b) through d) until no combination of remove queue virtual connections or no combination of add queue virtual connections can be found,
f) adding all add queue virtual connections to the network for which there are available network resources,
g) removing one remove queue virtual connection from the network, and
h) repeating steps f) through g) until the first virtual topology is migrated to the second virtual topology.

21. The method of claim 20 further comprising, prior to step f), the steps of:
i) if no combination of remove queue virtual connections have been removed but at least one combination of searched remove queue virtual connections satisfied the first criteria and the second criteria, removing one of said at least one combination of virtual connections from the network,
j) if no combination of remove queue virtual connections have been removed and no combination of searched remove queue virtual connections satisfied both criteria but at least one combination satisfied the first criteria, removing one of said at least one combination of virtual connections from the network,
k) if no combination of remove queue virtual connections have been removed, no combination of searched remove queue virtual connections satisfied both criteria, and no combination satisfied the first criteria but at least one combination satisfied the second criteria, removing one of said at least one combination of virtual connections from the network, and
l) if no combination of remove queue virtual connections have been removed and no combination of searched remove queue virtual connections satisfied any of the criteria, removing two virtual connections in the remove queue from the network.

22. The method of claim 21 further comprising, after step a), the step of
m) ordering the remove queue from top to bottom in ascending order based on traffic demands of each virtual connection in the queue, and
wherein step b) searches the remove queue based on virtual connections with lesser traffic demands, wherein step i) removes the first encountered combination of virtual connections that satisfied both criteria, wherein step j) removes the first encountered combination of virtual connections that satisfied the first criteria, wherein step k) removes the first encountered combination of virtual connections that satisfied the second criteria, and wherein step l) selects the first two virtual connections in the queue.

23. The method of claim 20 further comprising the steps of:
maintaining a log file to track all add queue virtual connections added to the network and all remove queue virtual connections removed from the network, and
if steps d) or f) does not successfully add an add queue virtual connection to the network, reversing the migration through the use of the log file and ending the migration.

* * * * *